United States Patent [19]

Yoshida et al.

[11] Patent Number: 4,570,441
[45] Date of Patent: Feb. 18, 1986

[54] HYDRAULIC VEHICLE CONTROL SYSTEM

[75] Inventors: Kazuhiro Yoshida, Hirakata; Takashi Murakami, Katano, both of Japan

[73] Assignee: Kabushiki Kaisha Komatsu Seisakusho, Tokyo, Japan

[21] Appl. No.: 506,984

[22] Filed: Jun. 23, 1983

[30] Foreign Application Priority Data

Jun. 29, 1982 [JP] Japan .................... 57-110721

[51] Int. Cl.$^4$ .................... F15B 13/09; F16H 39/46
[52] U.S. Cl. ........................ 60/421; 60/484; 60/486; 180/6.48
[58] Field of Search ........... 60/420, 421, 426, 430, 60/484, 486; 180/6.48

[56] References Cited

U.S. PATENT DOCUMENTS

| 3,655,004 | 4/1972 | Hoashi | 180/6.48 |
|---|---|---|---|
| 4,011,920 | 4/1977 | Bianchetta et al. | |
| 4,030,623 | 6/1977 | Bridwell et al. | 60/421 |
| 4,055,046 | 10/1977 | Schexnayder | |
| 4,324,098 | 4/1982 | Aruga et al. | 60/420 |
| 4,376,371 | 3/1983 | Kojima et al. | 60/420 |
| 4,431,365 | 2/1984 | Sturtz, Jr. | 60/420 |

FOREIGN PATENT DOCUMENTS 54-71262  6/1979  Japan .................... 60/420

Primary Examiner—Robert E. Garrett
Assistant Examiner—John M. Husar
Attorney, Agent, or Firm—Frost & Jacobs

[57] ABSTRACT

A control system for a hydraulic vehicle having a pair of bidirectional travel motors driven by respective pumps via respective travel valves, and implement actuators, including a swing motor, driven by the pumps via two parallel connections of pilot-operated implement valves. For making possible the straight travel of the vehicle, either forwardly or rearwardly, while any of the implement actuators is being driven by either pump, a straight travel valve is provided for the on-off control of communication between the forward travel ports, and between the rearward travel ports, of the two travel motors. Normally held closed under spring pressure, the straight travel valve is pilot opened by a series connection of two straight travel control valves, which delivers pilot control fluid to the straight travel valve when the travel valves are both hand operated to set the two travel motors into rotation in the same direction. The straight travel control valves receive the pilot control fluid from implement control valves provided for the pilot actuation of the implement valves. Thus the two travel motors when set into rotation in the same direction are driven by the combined power fluid from the two pumps if then any of the implement control valves is being operated for activating the corresponding implement actuator or actuators.

4 Claims, 1 Drawing Figure

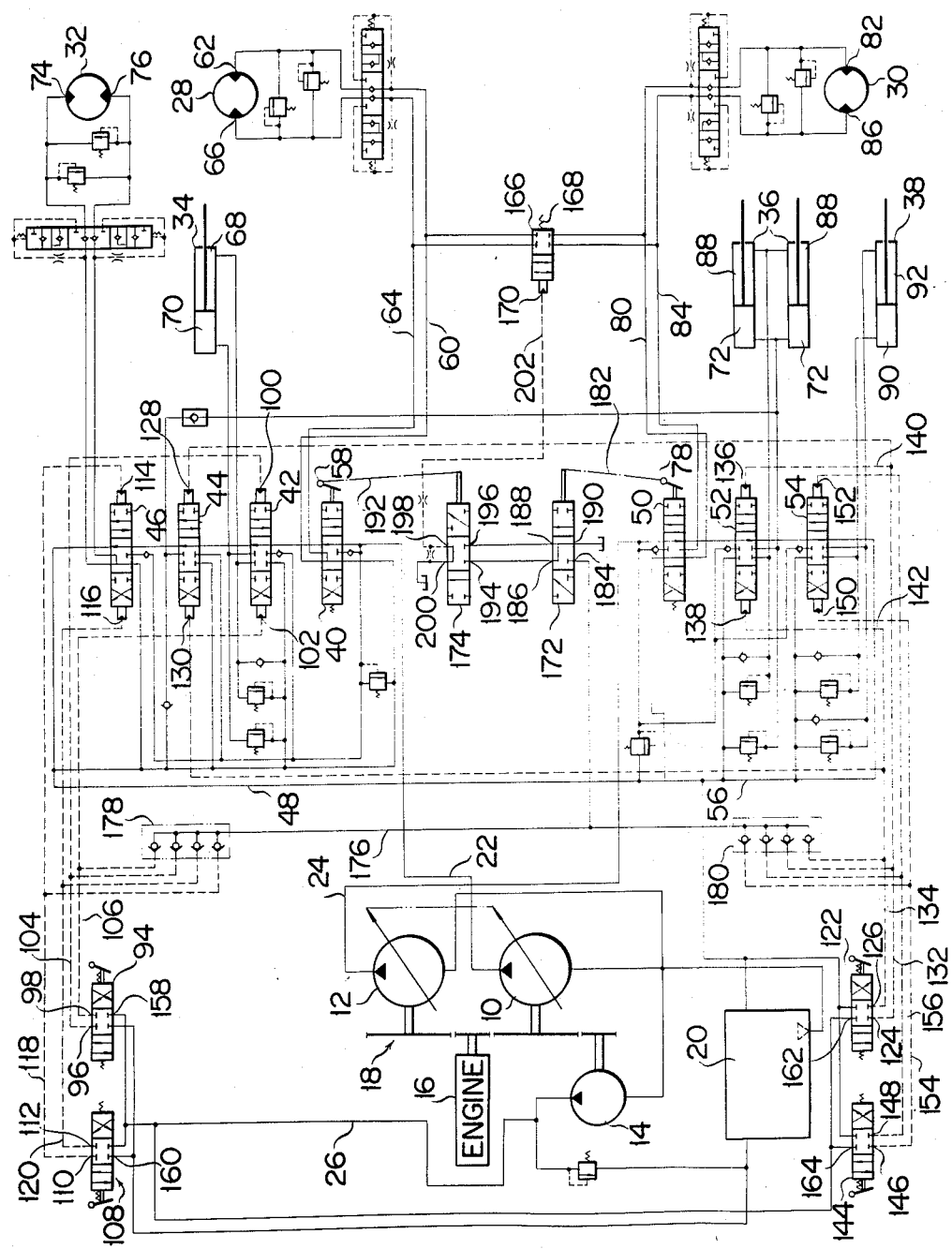

HYDRAULIC VEHICLE CONTROL SYSTEM

BACKGROUND OF THE INVENTION

The present invention pertains to hydraulic control systems and is directed more specifically to such a system for a vehicle of the class propelled by a pair of hydraulic bidirectional motors and also having several hydraulic actuators for manipulation of an implement.

Some off-highway self-propelled work machines operate hydraulically. A typical example of such hydraulic vehicles comprises a pair of travel motors and a plurality of implement actuators such as an arm cylinder, boom cylinders, and a bucket cylinder, as well as a swing motor for revolving the superstructure of the vehicle. The travel motors are powered respectively by a pair of pumps via a pair of travel valves. The implement actuators, including the swing motor, are also activated by the pumps via two groups of implement valves. Each group of implement valves, associated with one pump, are in parallel connection with one another and with one of the travel valves.

A problem has existed with this type of hydraulic vehicle control system. Let it be supposed that the vehicle travels forwardly or rearwardly, with both travel motors set into rotation in one and the same direction, while any of the implement actuators are being powered by one of the pumps. In that case this one pump must feed both the implement actuator and one of the travel motors whereas the other pump is required to feed only the other travel motor. The consequent difference between the rates of delivery of the pressurized fluid from the pumps to the travel motors has rendered the straight travel of the vehicle difficult or impossible.

SUMMARY OF THE INVENTION

This invention makes possible the straight travel, either forwardly or rearwardly, of a vehicle of the type defined even if one or more of the implement actuators are being activated concurrently with the vehicle travel.

Briefly the invention provides a hydraulic control system for a vehicle comprising a pair of bidirectional travel motors powered by a pair of pumps via a pair of travel valves, respectively, and implement actuator means also powered by the pair of pumps via respective implement valve means in parallel connection with the respective travel valves. A straight travel valve is connected between the forward travel ports, and between the rearward travel ports, of the two travel motors for the on-off control of fluid communication therebetween. Normally held closed, the straight travel valve is opened by straight travel control means to allow communication between the forward travel ports, and between the rearward travel ports, of the travel motors when the pair of travel valves are both actuated to set the travel motors into rotation in one and the same direction.

Preferably, as in an embodiment disclosed herein, a third pump is provided for supplying pilot control fluid for the actuation, via hand operated implement control valves, two groups of implement valves controlling the delivery of the power fluid from the pair of pumps to a plurality of implement actuators. The pilot control fluid being delivered from the implement control valves to the implement valves is also used by the straight travel control means as a pilot signal for opening the straight travel valve as required.

Thus, when the pair of travel valves are both actuated to set the travel motors into rotation in the same direction, these travel motors are activated by the combined power fluid from the pair of pumps, instead of by the power fluid from the respective pumps, if then any of the implement control valves are being hand operated for pilot actuating the corresponding one or ones of the implement valves.

The term "implement actuators", as used herein and in the claims appended hereto, may include a swing motor. Accordingly the the vehicle can be propelled straightly by the pair of travel motors, either forwardly or rearwardly, while at the same time its implement is being manipulated or while its superstructure is being revolved.

The above and other features and advantages of this invention and the manner of attaining them will become more apparent, and the invention itself will best be understood, from a study of the following description and appended claims, with reference had to the attached drawing showing a preferred embodiment of the invention.

BRIEF DESCRIPTION OF THE DRAWING

The Drawing is a schematic diagram of an example of hydraulic vehicle control system embodying the principles of the present invention.

DESCRIPTION OF THE PREFERRED EMBODIMENT

The exemplified hydraulic vehicle control system comprises two variable displacement pumps 10 and 12 and a smaller, fixed displacement pump 14. All the pumps are driven by a suitable prime mover such as an internal combustion engine 16 via a gear train 18. each pump draws hydraulic fluid from a reservoir or sump 20 and supplies it under pressure by way of respective supply lines or conduits 22, 24 and 26.

The two variable displacement pumps 10 and 12 supplies power fluid for serving a pair of bidirectional travel motors 28 and 30 for propelling the vehicle, and implement actuators which in this particular embodiment include a swing motor 32, an arm cylinder 34, a pair of boom cylinders 36, and a bucket cylinder 38. The fixed displacement pump 14, on the other hand, provides pilot control fluid for the actuation of various valves hereinafter set forth. To facilitate description the variable displacement pumps 10 and 12 will hereinafter be referred to as the first and second power pumps, respectively, and the fixed displacement pump 14 as the pilot pump.

The supply line 22 from the first power pump 10 leads to a parallel connection of:

1. A hand operated left travel valve 40 for controlling the left travel motor 28.
2. A pilot operated arm valve 42 for controlling the arm cylinder 34.
3. A pilot operated first boom valve 44 for controlling the boom cylinders 36.
4. A pilot operated swing valve 46 for controlling the swing motor 32.

The left travel valve 40 and the three implement valves 42, 44 and 46 are all of the three-position, normally centered type. When all these valves are in their normal positions, the supply line 22 is thereby placed in communication with a drain line 48 leading to the reservoir 20.

The supply line 24 from the second power pump 12, on the other hand, leads to another parallel connection of:

1. A hand operated right travel valve 50 for controlling the right travel motor 30.
2. A pilot operated second boom valve 52 for controlling the boom cylinders 36 in coaction with the first boom valve 44.
3. A pilot operated bucket valve 54 for controlling the bucket cylinder 38.

The right travel valve 50 and the two implement valves 52 and 54 are also all of the three-position, normally centered design. When all these valves are in their normal positions, the supply line 24 is therby placed in communication with a drain line 56 leading to the reservoir 20.

The left travel valve 40 when actuated to the right by a hand lever 58 places the supply line 22 in communication with a line 60 leading to a forward travel port 62 of the left travel motor 28. When actuated to the left, on the other hand, the left travel valve 40 places the supply line 22 in communication with a line 64 leading to a rearward travel port 66 of the left travel motor 28. The left travel motor rotates in a direction of forward vehicle travel upon reception of the power fluid from the first power pump 10 through its forward travel port 62, and in a direction of rearward vehicle travel upon reception of the power fluid through its rearward travel port 66.

The arm valve 42 when pilot actuated to the right places the supply line 22 in communication with the rod end or "down" chamber 68 of the arm cylinder 34. When pilot actuated to the left, on the other hand, the arm valve 42 places the supply line 22 in communication with the head end or "up" chamber 70 of the arm cylinder 34.

The first boom valve 44 when pilot actuated to the left places the supply line 22 in communication with the head end or "up" chambers 72 of the boom cylinders 36. When pilot actuated to the right the first boom valve serves merely to communicate the "up" chambers of the boom cylinders with the fluid drain.

The swing valve 46 when pilot actuated to the right places the supply line 22 in communication with a first port 74 of the swing motor 32, and in communication with a second port 76 of the swing motor when pilot actuated to the left.

The right travel valve 50 when actuated to the right by a hand lever 78 places the supply line 24 of the second power pump 12 in communication with a line 80 leading to a forward travel port 82 of the right travel motor 30. When hand operated to the left, on the other hand, the right travel valve 50 places the supply line 24 in communication with a line 84 leading to a rearward travel port 86 of the right travel motor 30. The right travel motor rotates rates in a direction of forward vehicle travel upon reception of the power fluid from the second power pump 12 through its forward travel port 82, and in a direction of rearward vehicle travel upon reception of the power fluid through its rearward travel port 86.

The second boom valve 52 when pilot actuated to the right places the supply line 24 in communication with the rod end or "down" chambers 88 of the boom cylinders 36, and in communication with their "up" chambers 72 when pilot actuated to the left. Thus the "up" chambers 72 of the boom cylinders 36 can receive the power fluid from both first and second power pumps 10 and 12 via the first and second boom valves 44 and 52.

The bucket valve 54 when pilot actuated to the right places the supply line 24 in communication with the head end or "dump" chamber 90 of the bucket cylinder 38, and in communication with its rod end or "tilt" chamber 92 when pilot actuated to the left.

The following implement control valves are provided for pilot operating the five implement valves:

1. An arm control valve 94 having outlet ports 96 and 98 in communication with the pilot ports 100 and 102 of the arm valve 42 by way of pilot lines 104 and 106.
2. A swing control valve 108 having outlet ports 110 and 112 in communication with the pilot ports 114 and 116 of the swing valve 46 by way of pilot lines 118 and 120.
3. A boom control valve 122 having outlet ports 124 and 126 in communication with the pilot ports 128 and 130 of the first boom valve 44 by way of pilot lines 132 and 134, and also with the pilot ports 136 and 138 of the second boom valve 52 by way of pilot lines 140 and 142 branching off from the pilot lines 132 and 134.
4. A bucket control valve 144 having outlet ports 146 and 148 in communication with the pilot ports 150 and 152 of the bucket valve 54 by way of pilot lines 154 and 156.

The listed four implement control valves 94, 108, 122 and 144 have inlet ports 158, 160, 162 and 164, respectively, which are coupled to the supply line 26 of the pilot pump 14. Thus, operated manually, each implement control valve selectively places the pilot pump 14 in and out of communication with the pilot ports of the corresponding one or ones of the five implement valves 42, 44, 46, 52 and 54 for the manipulation of the implement.

The foregoing will have made clear how the vehicle is operated hydraulically as the operator manipulates the two travel valves 40 and 50 and the four implement control valves 94, 108, 122 and 144. As has been stated, the invention seeks to drive the pair of travel motors 28 and 30 by the combined power fluid from both first 10 and second 12 power pumps for the straight travel, either forwardly or rearwardly, of the vehicle during the manipulation of the implement.

Provided toward this end is a straight travel valve 166 of the four-way, two-position, pilot-actuated, spring-return type. The straight travel valve 166 is connected between the lines 60 and 80, and between the lines 64 and 84, leading to the forward travel ports 62 and 82, and to the rearward travel ports 66 and 86, of the travel motors 28 and 30. Normally held closed under the bias of a spring 168, the straight travel valve 166 opens upon application of a pilot fluid signal to its pilot port 170. It is thus seen that the travel motors 28 and 30 are normally activated by the power fluid from the respective power pumps 10 and 12. Upon pilot actuation of the straight travel valve 166 the travel motors 28 and 30 are driven by the combined power fluid from the power pumps 10 and 12, either forwardly or rearwardly, because then the forward travel ports 62 and 82, and the rearward travel ports 66 and 86, of both travel motors intercommunicate.

The pilot actuation of the straight travel valve 166 to its open position must take place only when both left 40 and right 50 travel valves are hand operated to set the travel motors 28 and 30 into rotation in one and the same direction. Attaining this objective is a series connection of right 172 and left 174 straight travel control valves between the pilot port 170 of the straight travel valve 166 and a line 176. This line 176 admits pilot control fluid from the pilot lines 104, 106, 118 and 120 via a group of check valves 178 and from the pilot lines 132, 134, 154 and 156 via another group of check valves 180.

The right straight travel control valve 172 is a four-way, three-position valve, actuated from the hand lever 78 of the right travel valve 50 via linkage 182. This linkage is such that the right straight travel control valve 172 is held centered when the right travel valve 50 is in its center position, and travels in the same direction as the right travel valve upon manipulation of the hand lever 78. The three positions of the right straight travel control valve 172 are:

1. A neutral position where an inlet port 184 in communication with the line 176 is blocked, and first 186 and second 188 outlet ports are both communicated with a drain port 190.
2. A right hand offset position where the inlet port 184 is communicated with the first outlet port 186, and the second outlet port 188 and drain port 190 are both blocked.
3. A left hand offset position where the inlet port 184 is communicated with the second outlet port 188, and the first outlet port 186 and drain port 190 are both blocked.

The left straight travel control valve 174 is also a fourway, three-position valve, actuated from the hand lever 58 of the left travel valve 40 via linkage 192 similar to the linkage 182. Thus the left straight travel control valve 174 is held centered when the left travel valve 40 is in its center position, and travels in the same direction as the left travel valve upon manipulation of the hand lever 58. The left straight travel control valve 174 has the following three positions:

1. A neutral position where first 194 and second 196 inlet ports, in communication with the first 186 and second 188 outlet ports, respectively, of the right straight travel control valve 172, are both blocked, and an outlet port 198 in communication with the pilot port 170 of the straight travel valve 166 is communicated with a drain port 200.
2. A right hand offset position where the first inlet port 194 is communicated with the outlet port 198, and the second inlet port 196 and drain port 200 are both blocked.
3. A left hand offset position where the second inlet port 194 is communicated with the outlet port 198, and the first inlet port 194 and drain port 200 are both blocked.

In operation, let it be assumed that the operator has now actuated the left 40 and right 50 travel valves in the same direction to set both travel motors 28 and 30 into rotation in the corresponding direction, either forward or rearward. Then the right 172 and left 174 straight travel control valves will be actuated simultaneously to their right hand or left hand offset positions. In either case the straight travel control valves 172 and 174 will place the line 176 in communication with a pilot line 202 leading to the pilot port 170 of the straight travel valve 166.

If then the vehicle implement is being manipulated by at least one of the implement valves 42, 44, 46, 52 and 54, that implement valve is receiving the pilot control fluid from the corresponding one of the implement control valves 94, 108, 122 and 144 by way of either of the pilot lines 104, 106, 118, 120, 132, 134, 154 and 156. All these pilot lines communicate with the line 176 via the groups of check valves 178 and 180. Since the line 176 is now communicated with the pilot line 202 by the two straight travel control valves 172 and 174, the pilot control fluid is applied to the pilot port 170 of the straight travel valve 166, thereby causing the same to travel to the open position against the force of the spring 168.

The result is the intercommunication of the forward travel ports 62 and 82, and of the rearward travel ports 66 and 86, of the two travel motors 28 and 30 through the straight travel valve 166. Consequently the travel motors 28 and 30 are driven, either forwardly or rearwardly, by the combined power fluid from the two power pumps 10 and 12. Thus, even though the flow rates of the power fluid from the travel valves 40 and 50 may differ, the power fluid will nevertheless flow at the same rate into the travel motors 28 and 30, making possible the straight forward or rearward travel of the vehicle with concurrent implement manipulation.

It will of course be seen that the straight travel valve 166 remains closed despite the actuation of the two travel valves 40 and 50 in the same direction if then none of the implement valves 42, 44, 46, 52 and 54 is being pilot actuated. For, even though the straight travel control valves 172 and 174 are then positioned to communicate the line 176 with the pilot line 202, no pilot control fluid flows into the line 176. The invention thus avoids needless use of the power output from the pilot pump 14.

The operator may of course actuate the two travel valves 40 and 50 in opposite directions or may actuate only one of them for steering the vehicle. In these cases the straight travel control valves 172 and 174 hold the line 176 out of communication with the pilot line 202. Accordingly the straight travel valve 166 remains closed under spring pressure even if the pilot control fluid flows into the line 176 as a result of the pilot actuation of any one or more of the implement valves 42, 44, 46, 52 and 54. The usual steering of the vehicle is therefore not impeded in any way by the improved means of this invention.

It is to be understood that the foregoing disclosure is by way of example only and is not to be taken as a definition of the invention. Thus, for instance, the straight travel control valves 172 and 174 may be coupled directly to the travel valves 50 and 40 for joint actuation by the hand levers 78 and 58, respectively, instead of being connected thereto via the linkages 182 and 192. Additional modifications and variations of the invention will occur to one skilled in the art without departing from the spirit or scope of the invention as expressed in the following claims.

What we claim is:
1. A hydraulic vehicle control system comprising:
   (a) first and second pumps for supplying power fluid;
   (b) implement actuator means;
   (c) first and second bidirectional travel motors each having a forward travel port for the reception of the power fluid for rotation in a forward direction and a rearward travel port for the reception of the power fluid for rotation in a rearward direction;
   (d) first implement valve means for controlling the delivery of the power fluid from the first pump to the implement actuator means;

(e) second implement valve means for controlling the delivery of the power fluid from the second pump to the implement actuator means;

(f) a first travel valve connected in parallel with the first implement valve means for controlling the delivery of the power fluid from the first pump to the forward and rearward travel ports of the first travel motor;

(g) a second travel valve connected in parallel with the second implement valve means for controlling the delivery of the power fluid from the second pump to the forward and rearward travel ports of the second travel motor;

(h) a straight travel valve for the on-off control of communication between the forward travel ports, and between the rearward travel ports, of the first and second travel motors, the straight travel valve being normally held closed to block communication therebetween, the straight travel valve being pilot actuated to open; and (i) straight travel control means for causing the straight travel valve to allow communication between the forward travel ports, and between the rearward travel ports, of the first and second travel motors when the first and second travel valves are both actuated to set the first and second travel motors into rotation in the same direction, said straight travel control means comprising a source of pilot control fluid; and straight travel control valve means responsive to the actuation of the first and second travel valves for delivering the pilot control fluid to a pilot port of the straight travel valve when the first and second travel valves are both actuated to set the first and second travel motors into rotation in the same direction; said straight travel control valve means further comprising a first straight travel control valve normally blocking the pilot control fluid and allowing the pilot control fluid to pass therethrough on actuation of one of the first and second travel valves in either direction; and a second straight travel control valve for permitting the pilot control fluid from the first straight travel control valve to pass therethrough only when the other of the first and second travel valves is actuated in the same direction as said one of the first and second travel valves.

2. The hydraulic vehicle control system of claim 1 further comprising implement control valve means connected between the source of pilot control fluid and the first and second implement valve means for pilot operating the latter.

3. A hydraulic control system for a vehicle of the type having implement actuator means and first and second bidirectional travel motors, each travel motor having a forward travel port for the reception of power fluid for rotation in a direction of forward vehicle travel and a rearward travel port for the reception of power fluid for rotation in a direction of rearward vehicle travel, the control system comprising:

(a) first and second pumps for supplying power fluid;
(b) a third pump for supplying pilot control fluid;
(c) first pilot-operated implement valve means for controlling the delivery of the power fluid from the first pump to the implement actuator means;

(d) second pilot-operated implement valve means for controlling the delivery of the power fluid from the second pump to the implement actuator means;

(e) implement control valve means for pilot operating the first and second implement valve means by controlling the delivery of the pilot control fluid from the third pump thereto;

(f) a first travel valve connected in parallel with the first implement valve means for controlling the delivery of the power fluid from the first pump to the forward and rearward travel ports of the first travel motor;

(g) a second travel valve connected in parallel with the second implement valve means for controlling the delivery of the power fluid from the second pump to the forward and rearward travel ports of the second travel motor;

(h) a straight travel valve for the on-off control of communication between the forward travel ports, and between the rearward travel ports, of the first and second travel motors, the straight travel valve being normally held closed to block communication therebetween and being pilot actuated to open; and (i) straight travel control valve means responsive to the actuation of the first and second travel valves for delivering the pilot control fluid from the implement control valve means to a pilot port of the straight valve when the first and second travel valves are both actuated to set the first and second travel motors into rotation in the same direction;

(j) whereby the first and second travel motors when set into rotation in the same direction are powered by the combined power fluid from the first and second pumps if then at least either of the first and second implement valve means is being pilot actuated by the implement control valve means, thereby making possible the straight travel of the vehicle in either the forward or rearward direction; said straight travel control valve means comprising a first straight travel control valve normally blocking the pilot control fluid and allowing the pilot control fluid to pass therethrough upon actuation of one of the first and second travel valves in either direction; and a second travel control valve for permitting the pilot control fluid from the first straight travel control valve to pass therethrough only when the other of the first and second travel valves is actuated in the same direction as said one of the first and second travel valves.

4. The hydraulic control system of claim 3 wherein each of the first and second implement valve means comprises a parallel connection of implement valves, wherein the implement control valve means comprises a plurality of implement control valves for pilot operating the individual implement valves, and wherein the straight travel control valve means is connected to receive the pilot control fluid from the implement control valves via respective check valves, whereby the first and second travel motors when set into rotation in the same direction are powered by the combined power fluid from the first and second pumps if then at least one of the implement valves is being pilot actuated by one of the implement control valves.

* * * * *